United States Patent Office 3,491,359
Patented Jan. 20, 1970

3,491,359
FREQUENCY SWEPT REPLY RADAR TRANSPONDER
Reginald George Amos, 43 Aylward Gardens, Chesham, Buckinghamshire, England
Filed Dec. 11, 1968, Ser. No. 783,075
Claims priority, application Great Britain, Dec. 13, 1967, 56,631/67
Int. Cl. G01s 9/56
U.S. Cl. 343—6.8                    5 Claims

ABSTRACT OF THE DISCLOSURE

A radar transponder which generates frequency swept signals in response to an interrogation signal. Detectors tuned to the frequencies of the derived sweep limits are used to reverse the direction of the sweep to stabilize the sweep limit.

---

This invention relates to improvements in radar transponder devices and has for its object the provision of a transponder device which provides advantages of low power consumption and accurately maintained transmission band.

According to the present invention there is provided a radar transponder device including detecting means for generating a signal when interrogation signals are received by said transponder, a variable frequency oscillator, a generator means for generating a control signal which varies in a cyclically discontinuous manner and applies it to said oscillator for controlling the frequency of said oscillator so that it varies in a cyclic fashion, means for initiating the operation of said oscillator in response to said generated signals, means for applying the output of said oscillator to an aerial, further detecting means for generating a band edge signal when the output of said oscillator contains oscillations of a predetermined frequency, and means for utilizing said band edge signal to reverse the sweep of the cyclically discontinuous control signal.

According to a feature of said invention said further detecting means includes means for generating a band edge signal when said oscillator generates oscillations at a predetermined frequency corresponding to a required upper limit of the swept frequency band and further means for generating a band edge signal when the said oscillator generates oscillations at a predetermined frequency corresponding to a required lower limit of the swept frequency band.

In one embodiment of the invention said cyclically discontinuous signal is a saw-tooth.

According to another feature of said invention said further detecting means includes two resonant cavities coupled to a wave guide feeding said aerial each of which is coupled to a wave guide stub containing a diode detector, said resonant cavities being respectively resonant at the required upper and lower limits of the swept frequency band.

In a preferred embodiment of said invention said means for applying the output of the oscillator to an aerial includes a frequency multiplying means.

Figure 1:
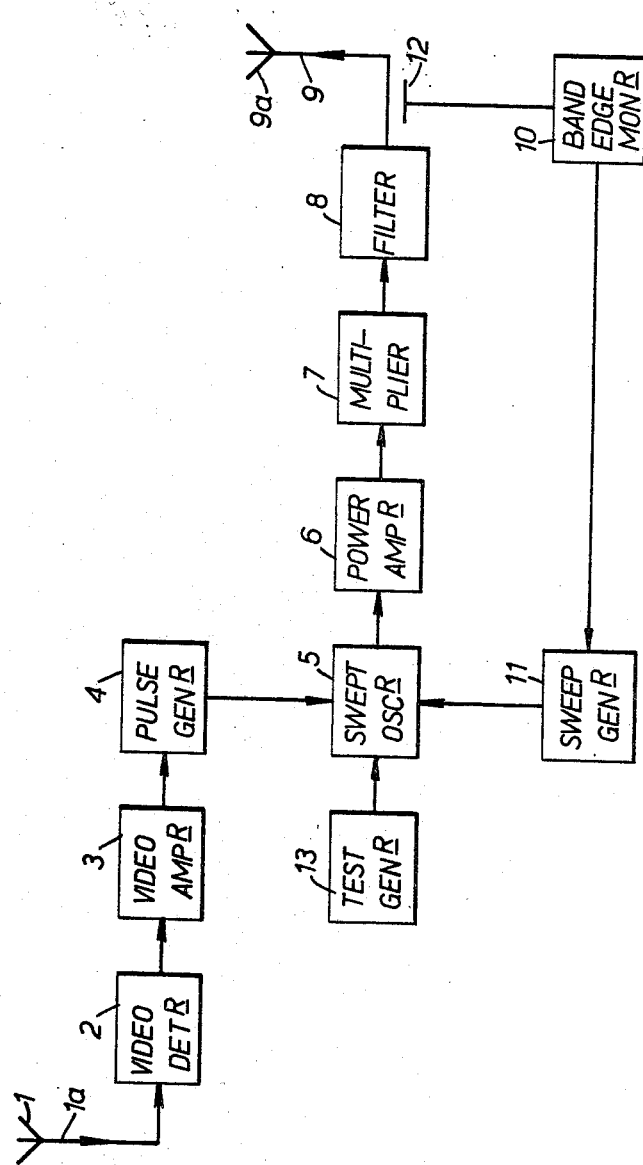
Figure 2:
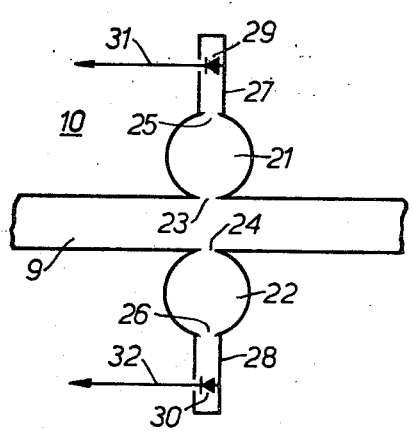
Figure 3:
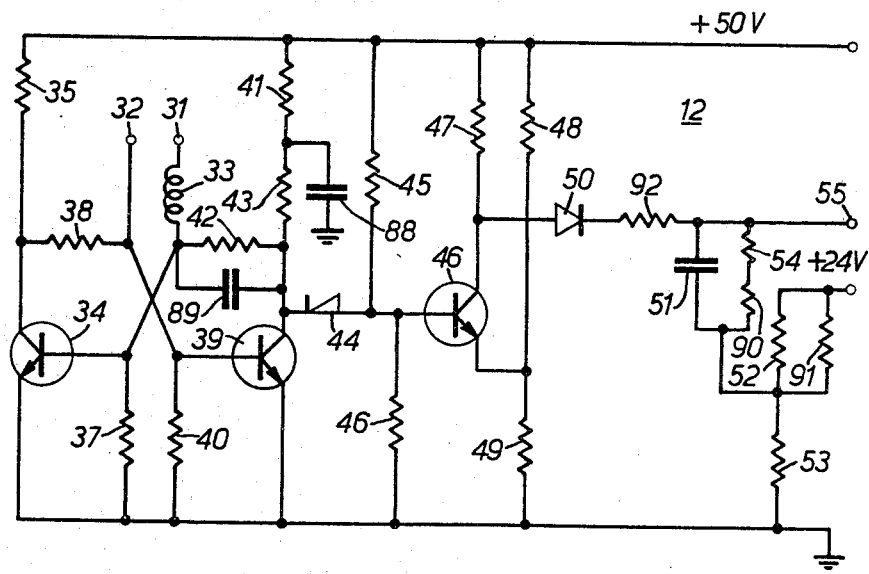
Figure 4:
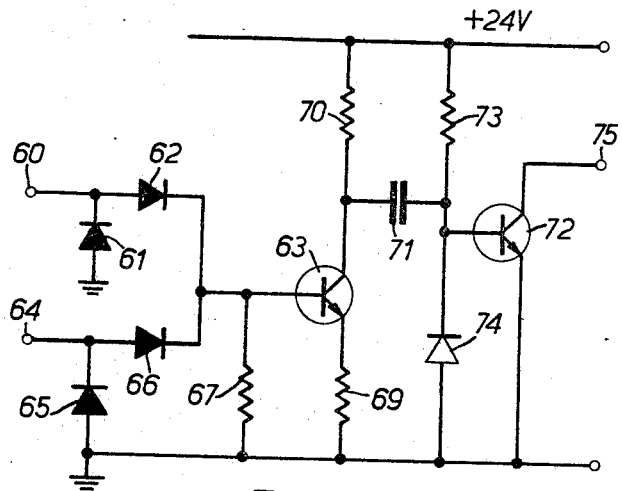
Figure 5:
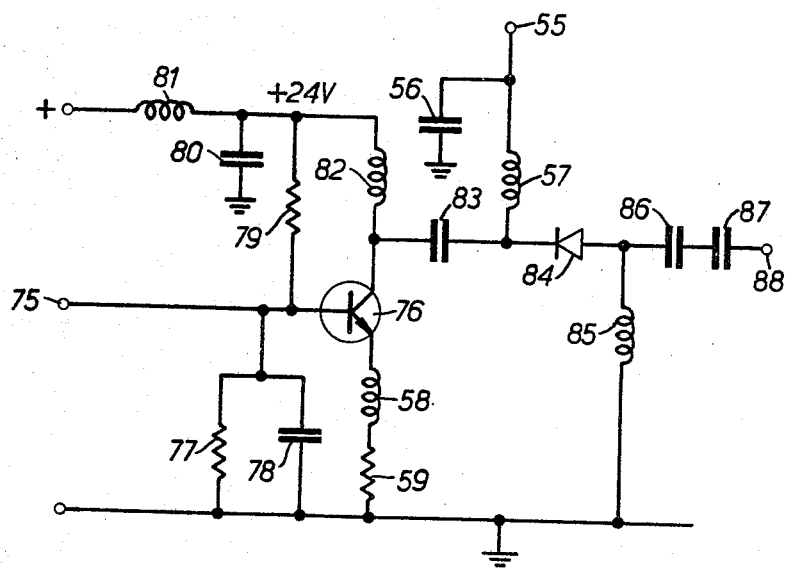

In order that the invention may be clearly understood and readily carried into effect it will now be described by way of example with reference to the drawings, in which:

FIGURE 1 is a block diagram of a transponder;
FIGURE 2 is a schematic diagram illustrating the band edge monitor 10 of FIGURE 1;
FIGURE 3 is a circuit diagram showing a preferred form of the sweep generator 11 of FIGURE 1;
FIGURE 4 is a circuit diagram showing a preferred embodiment of a modulator circuit used to initiate the operation of the sweep oscillator 5 of FIGURE 1; and
FIGURE 5 is a circuit diagram showing a preferred embodiment of the sweep oscillator 5 of FIGURE 1.

Referring to FIGURE 1, radio-frequency radar signals, usually in the X band, are received by a suitable conventional aerial system and are applied by way of a waveguide 1 to a video detector 2 in which they are demodulated to recover the video frequency component. This video frequency component is amplified in a video amplifier 3 and is applied to trigger a pulse generator 4. This pulse generator may provide at its output either a single pulse of predetermined duration or a coded succession of pulses capable of indicating the identity of the transponder. The output from pulse generator 4 is applied to initiate the operation of a variable-frequency oscillator 5, the operating frequency of which is swept over an appropriate frequency band in the manner hereinafter described. Signals from oscillator 5 are fed into a power amplifier 6 whence they pass to a frequency multiplier 7, the output signals from which have a frequency in the appropriate radar band. These output signals are passed through a conventional harmonic-suppressing filter 8 and taken by way of an output waveguide 9 to an appropriate aerial, whence they are radiated and received by the receiver of the triggering radar system.

The apparatus has particular application as a transponder installation for navigational buoys. Although radar transponders for use in navigation have previously been proposed, they have employed magnetron oscillators of low reliability and high power consumption so that they have been unsuitable for unattended operation, especially for use in buoys where the power consumption is a critical factor.

In a transponder apparatus including the invention for use with X band radar, the frequency range of variable-frequency oscillator 5 may be from 581.25 mHz. to 593.75 mHz. and the multiplier 7 may multiply the frequency of applied signals by a factor of 16, conveniently in two stages of x4 and x4, thus yielding output signals in the required frequency band of 9.3 to 9.5 gHz.

In order to ensure that the frequency sweep of the variable-frequency oscillator 5 fully covers the required band, use is made of a band-edge monitor 10, coupled to output waveguide 9, as indicated at 12. The function of band-edge monitor 10 is to ensure that the variation in the frequency-controlling potential applied from a sweep generator 11 to control the output frequency of oscillator 5 is such that the output frequency varies between the required limits. To this end, monitor 10 includes means yielding a first signal when the required upper limiting frequency of 9.5 gHz. is reached and a second signal when the required lower limiting frequency of 9.4 gHz. is reached. One of these signals is applied to initiate the sweeping stroke of sweep generator 11, and the other to initiate its flyback regime.

As shown schematically in FIGURE 2, band-edge monitor 10 conveniently comprises two resonant cavities 21 and 22, each coupled by way of a respective coupling aperture 23 and 24 with output waveguide 9. Cavities 21 and 22 preferably resonate in the $TE_{011}$ mode. To each of cavities 21, 22 there is coupled by way of a further coupling aperture 25, 26 a waveguide stub 27, 28 containing a diode detector 29, 30. Cavity 21 is designed to resonate at, say, 9.5 gHz., and cavity 22 at, say, 9.3 gHz. The signals appearing on diodes 29 and 30 when the signal passing through waveguide 9 is of the appropriate frequency are applied by way of respective leads 31, 32 to the similarly numbered terminals in the sweep generator circuit shown in FIGURE 3.

FIGURE 3 shows a convenient form of sweep generator circuit in which the required sweep voltage is generated by the alternate charging and discharging of a capacitor under the control of a bistable circuit to which are applied the signals developed in band-edge monitor 10.

When a positive-going signal is received from resonator 21 at terminal 31, this signal passes by way of a choke 33 to the base of a transistor 34. Transistor 34 has its emitter returned directly to the earthed negative line, and its collector returned by way of a load resistor 35 to a +50 v. line and also by way of a resistor 38 to the base of a transistor 39 which with transistor 34 forms a bistable circuit. The emitter of transistor 39 is returned directly to the negative line, while its base is returned to the negative line by way of a resistor 40 and its collector is taken to the +50 v. line by way of a series combination of resistor 43 and resistor 41. The junction of these resistors is returned to earth via capacitor 88. The collector of transistor 39 is also connected by way of a parallel combination of resistor 42 and capacitor 89 to the base of transistor 34. The arrival of the signal from cavity 21 drives the base of transistor 34 positively, thus causing the transistor to pass current. The resulting negative-going change in potential at the collector of transistor 34 causes a corresponding change in the base potential of transistor 39, which is thus cut off, so that its collector acquires a more positive potential. A corresponding positive change in potential is thus produced at the base of transistor 34 and the circuit assumes its second stable condition, which persists during the sweep stroke.

During this phase of operation the collector of transistor 39 is at a relatively high positive potential. A diode 44, which has its cathode connected to the collector of transistor 39 and its anode potential determined by a potential divider consisting of resistors 45 and 46 connected in series across the +50 v. supply, is therefore cut off.

A transistor 46 has its base connected directly to the anode of diode 44, while its collector is returned to the +50 v. line by way of a resistor 47 and its emitter is returned to the tapping of a voltage divider formed by resistors 48 and 49 connected in series across the +50 v. supply. When transistor 39 is cut off the potential at the base of transistor 46 is now more positive than that at its emitter so that the transistor passes current and its collector potential falls. To the collector of transistor 46 is connected the anode of a diode 50 of which the cathode is connected, via resistor 92, to one terminal of a capacitor 51, the other terminal of which is taken to the junction of resistors 53 and the parallel combination of resistors 52 and 91 across at +24 v. supply. The value of resistor 91 is determined in test to give the required sweep time. Diode 50 is now cut off and capacitor 51, which during the preceding flyback regime, when transistor 46 was cut off, was charged from the +50 v. supply by way of resistor 47 and diode 50, and resistor 92 discharges by way of the series combination of resistor 54 and resistor 90 connected in parallel with it. The varying potential across capacitor 51 is fed out by way of an output terminal 55 to control the frequency of the swept oscillator, as described in relation to FIGURE 5.

When the oscillator frequency attains the lower desired frequency of 9.3 gHz., cavity 22 will yield a signal which is applied to terminal 32 and thence to the base of transistor 39, which is thus turned on. The potential at the collector of transistor 34 thus falls and diode 44 becomes conductive, so that the base potential of transistor 46 falls and the transistor is cut off. The collector potential of transistor 46 thus rises and a rapid flyback regime is produced by the charging of capacitor 51 from the +50 v. supply by way of diode 50.

The circuit is thus returned to its initial condition and the cycle is repeated.

FIGURE 4 shows a modulator circuit used to initiate the operation of swept oscillator when an interrogating radar signal is received or when test generator 13 provides a signal. Signals from generator 13 are received at a terminal 60. Negative-going signals are shunted to earth by way of a diode 61, but positive-going signals pass through another diode 62 to the base of a transistor 63. Similarly, negative-going signals received from pulse generator 4 at a terminal 64 are shunted to earth by a diode 65, while positive-going signals pass through a diode 66 to the base of transistor 63. The base of transistor 63 is returned to earth by way of a resistor 67, its emitter is returned to the earthed negative supply line by way of a resistor 69, and its collector is returned to the +24 v. line by way of a resistor 70.

When a signal received from pulse generator 4 or from test generator 13 causes transistor 63 to conduct so that its collector potential falls abruptly. This negative-going change in potential is applied by way of a capacitor 71 to the base of a transistor 72. The base of this transistor is returned to the +24 v. line by way of a resistor 73 and to the negative line by way of an inverted diode 74. Transistor 72 is thus cut off. By way of a terminal 75, to which its collector is connected and the similarly numbered terminal in FIGURE 5, the emitter-collector path of transistor 72 is connected between the base of an oscillator transistor 76 and the negative line. Thus when transistor 72 is conductive oscillator transistor 76 is rendered inoperative, but when transistor 72 is cut off oscillator transistor 76 becomes operative to act as an emitter-coupled oscillator. The base of transistor 76 is returned to the negative line by way of the parallel combination of a resistor 77 and a capacitor 78 and is also returned to the +24 v. line by way of a resistor 79. The +24 v. line is by-passed to earth by a capacitor 80, which may in practice comprise the effective parallel combination of a plurality of capacitors of widely differing values, chosen to provide a minimum reactance over a wide frequency band. The direct current supply to the +24 v. line is obtained by way of a choke 81 from a supply of higher voltage.

The emitter of transistor 76 is returned to the negative line for direct current, but isolated at signal frequencies, by the series combination of an R.F. choke 58 and a resistor 59.

The collector of transistor 76 is fed from the +24 v. line by way of an R.F. choke 82 and is connected by way of a D.C. isolating capacitor 83 to a series-resonant circuit comprising a variable-capacitance diode 84 and a tuning coil 85. The oscillating voltage appearing across coil 85 is fed out by way of series-connected capacitors 86, 87 and an output terminal 88 to power amplifier 6.

The effective capacitance of diode 84 is controlled by the magnitude of the bias voltage applied to it from sweep generator 11 by way of terminal 55. This terminal is by-passed to earth by way of a capacitor 56 and is connected to the cathode of diode 84 by way of an R.F. choke 57. Thus the varying sweep voltage produced in sweep generator 11 controls the effective capacitance of diode 84 and hence the frequency of oscillation of oscillator 5, which becomes operative only when initiated by an interrogating signal or a test pulse, so that its current drain is kept to a minimum.

Values of circuit components suitable for use in practical embodiments of the circuits described in relation to FIGURES 3, 4 and 5 are as follows:

Transistors

| | |
|---|---|
| 34, 39 | 2N706A, Texas Instruments. |
| 46 | do. |
| 63 | 2N2540, Mullard. |
| 72 | do. |
| 76 | 2N3866, R.C.A. |

Diodes

| | |
|---|---|
| 44 | OA202, Mullard. |
| 50 | do. |
| 61, 62 | BAX13, Mullard. |
| 65, 66 | do. |
| 74 | do. |
| 84 | VCM 76, S.T.C. |

Resistors

| Component | Value | Unit |
|---|---|---|
| 35, 41 | 47 | kilohms |
| 43 | 1.0 | do |
| 37, 40 | 10 | do |
| 38 | 100 | do |
| 42 | 100 | do |
| 45 | 33 | do |
| 46 | 15 | do |
| 47 | 47 | do |
| 48 | 39 | do |
| 49 | 1 | do |
| 52 | 8.2 | do |
| 53 | 27 | do |
| 54 | 22 | megohms |
| 59 | 47 | ohms |
| 67 | 5.6 | kilohms |
| 69 | 5.6 | do |
| 70 | 3.3 | do |
| 73 | 47 | do |
| 77 | 1.8 | do |
| 79 | 8.2 | do |
| 90 | 4.7 | megohms |
| 91, determine in test. | | |
| 92 | 82 | kilohms |

Capacitors

| Component | Value | Unit |
|---|---|---|
| 51 | 10 | µf |
| 71 | 0.1 | µf |
| 78 | 10 | pf |
| 83 | 1000 | pf |
| 86, 87 | 1.0 | pf |
| 88 | 5 | µf |
| 89 | 33 | pf |

Inductors

| Component | Value | Unit |
|---|---|---|
| 33 | 0.2 | mh |
| 57 | 0.2 | mh |
| 58 | 0.2 | mh |
| 81 | 0.2 | mh |
| 82 | 0.2 | mh |
| 85 | 0.035 | µh |

It will be understood that the apparatus described above may be modified, in ways which are apparent to the expert, so as to be capable of operation in other frequency bands than that for which specific component values are given.

It will also be appreciated that while in the above description the frequency of the oscillator has been varied by means of a saw-tooth voltage, this is not essential, and it is possible to use any suitable wave form to modulate the frequency of said oscillator. For example, a triangular wave may be used. Such wave forms comprising triangular or saw tooth waves which have discontinuities in their form at the amplitude limits thereof are referred to as cyclically discontinuous.

What I claim is:

1. A radar transponder device including detecting means for generating a signal when interrogation signals are received by said transponder, a variable frequency oscillator, a general means for producing a control signal which varies in a cyclically discontinuous manner and applies it to said oscillator for controlling the frequency of said oscillator so that it varies in a cyclic fashion, means for initiating the operation of said oscillator in response to said generated signal, means for applying the output of said oscillator to an aerial, further detecting means for generating a band edge signal when the output of said oscillator contains oscillations of a predetermined frequency, and means for utilising said band edge signal to reverse the sweep of the cyclically discontinuous control signal.

2. A radar transponder device according to claim 1, in which said further detecting means includes means for generating a band edge signal when said oscillator generates oscillations at a predetermined frequency corresponding to a required upper limit of the swept frequency band and further means for generating a band edge signal when the said oscillator generates oscillations at a predetermined frequency corresponding to a required lower limit of the swept frequency band.

3. A radar transponder according to claim 1 in which said cyclically discontinuous control signal is a saw-tooth.

4. A radar transponder device according to claim 1, in which said further detecting means includes two resonant cavities coupled to a wave guide feeding said aerial each of which is coupled to a wave guide stub containing a diode detector, said resonant cavities being respectively resonant at the required upper and lower limits of the swept frequency band.

5. A radar transponder device according to claim 1, in which said means for applying the output of the oscillator to an aerial includes a frequency multiplying means.

References Cited

UNITED STATES PATENTS 3,241,137    3/1966    Smoll _____ 343—6.8

RODNEY D. BENNETT, JR., Primary Examiner

M. F. HUBLER, Assistant Examiner